(12) United States Patent
Pelosi

(10) Patent No.: US 8,670,848 B1
(45) Date of Patent: Mar. 11, 2014

(54) METHOD OF CALCULATING TARGET PACE FOR ACHIEVING A GOAL ON AN EXERCISE ROUTE AND RELATED PORTABLE ELECTRONIC DEVICE

(75) Inventor: Anthony Pelosi, San Dimas, CA (US)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 0 days.

(21) Appl. No.: 13/612,878

(22) Filed: Sep. 13, 2012

(51) Int. Cl.
*G06F 19/00* (2011.01)

(52) U.S. Cl.
USPC .......................................................... 700/91

(58) Field of Classification Search
USPC ....................................... 700/90, 91; 482/7–9
See application file for complete search history.

(56) References Cited

U.S. PATENT DOCUMENTS

| | | | | |
|---|---|---|---|---|
| 8,033,959 | B2* | 10/2011 | Oleson et al. ...................... | 482/9 |
| 8,241,184 | B2* | 8/2012 | DiBenedetto et al. ............ | 482/9 |
| 2010/0292050 | A1* | 11/2010 | DiBenedetto et al. ............ | 482/9 |
| 2010/0292599 | A1* | 11/2010 | Oleson et al. ................... | 600/519 |
| 2010/0292600 | A1* | 11/2010 | DiBenedetto et al. ......... | 600/520 |
| 2012/0015779 | A1* | 1/2012 | Powch et al. ...................... | 482/9 |
| 2012/0028762 | A1* | 2/2012 | Oleson et al. ...................... | 482/9 |
| 2012/0274469 | A1* | 11/2012 | Oleson et al. ............... | 340/573.1 |

\* cited by examiner

*Primary Examiner* — Ronald Laneau
(74) *Attorney, Agent, or Firm* — Winston Hsu; Scott Margo

(57) ABSTRACT

A method of calculating an exercise goal includes receiving a selection of exercise route data from the user indicating a length of an exercise route, calculating a distance that the user has completed on the exercise route and a corresponding elapsed time for a completed portion of the exercise route, and calculating a target pace for a remaining portion of the exercise route not yet completed, the target pace indicating a pace at which the user needs to move along the exercise route in order to achieve an exercise goal associated with the exercise route data received from the user. The method also includes outputting the target pace to the user for informing the user about the target pace, and repeatedly dynamically calculating the target pace and outputting the target pace until completion of the exercise route.

16 Claims, 8 Drawing Sheets

| Current pace | 9:39 /mi |  |
|---|---|---|
| Target pace | 9:40 /mi |  |
| Time ahead | Dist ahead | |
| 03:03 | 0.33 /mi | |

FIG. 3

| ETA | 10:54⁰⁰ am |
|---|---|
| Est total time | 3:54:00 |
| Est rem time | Rem dist |
| 54:00 | 6.20 mi |

FIG. 4

| ETA | 11:00 am |
|---|---|
| Est total dist | 26.66 mi |
| Rem time | 1:00 | Est rem dist | 6.66 mi |

| Current pace | 9:39 /mi |
|---|---|
| Avg pace | 9:00 /mi |
| Time ahead | 03:03 |
| Dist ahead | 0.33 mi |

FIG. 6

METHOD OF CALCULATING TARGET PACE FOR ACHIEVING A GOAL ON AN EXERCISE ROUTE AND RELATED PORTABLE ELECTRONIC DEVICE

BACKGROUND OF THE INVENTION

1. Field of the Invention

The invention relates to a portable electronic device, and more particularly, to a portable electronic device that dynamically calculates a target pace for a user on an exercise route in order to achieve a goal that the user set for the exercise route.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Currently, portable electronic devices employing GPS or other such location calculating services are increasingly used for outdoor activities such as hiking, running, or cycling. As a result, users now commonly use a portable electronic device when training for a fitness event, such as a marathon. The portable electronic device can tell a user how far the user has traveled along a completed portion of an exercise route and how much time has elapsed while traveling along the completed portion of the exercise route.

However, conventional portable electronic devices are unable to inform the user what target pace, also known as target speed, that the user must move at for a remaining portion of the exercise route not yet completed in order to achieve an exercise goal that the user set for the exercise route. The lack of the target pace that the user should be aiming for makes it more difficult for the user to know exactly what is required of the user in order for the user to achieve the exercise goal.

SUMMARY OF THE INVENTION

It is therefore one of the primary objectives of the claimed invention to provide a method of calculating a target pace needed for the user of a portable electronic device to move at in order to achieve an exercise goal.

According to an exemplary embodiment of the claimed invention, a method of informing a user of a portable electronic device about apace that the user needs to maintain in order to achieve an exercise goal is disclosed. The method includes receiving a selection of exercise route data from the user, the exercise route data including at least two parameters selected from the group consisting of a predetermined distance of the exercise route, a predetermined exercise time for the exercise route, and a desired pace to be used on the exercise route, receiving position signals indicating a current position of the portable electronic device as the user follows the exercise route, and calculating a distance that the user has completed on the exercise route and a corresponding elapsed time for a completed portion of the exercise route. The method also includes dynamically calculating a target pace for a remaining portion of the exercise route not yet completed, the target pace indicating a pace at which the user needs to move along the exercise route in order to achieve an exercise goal associated with the exercise route data received from the user, outputting the target pace to the user for informing the user about the target pace, and repeatedly dynamically calculating the target pace and outputting the target pace until completion of the exercise route.

According to another exemplary embodiment of the claimed invention, a portable electronic device informing a user of the portable electronic device about apace that the user needs to maintain in order to achieve an exercise goal is disclosed. The portable electronic device includes a user interface for receiving a selection of exercise route data from the user, the exercise route data including at least two parameters selected from the group consisting of a predetermined distance of the exercise route, a predetermined exercise time for the exercise route, and a desired pace to be used on the exercise route. The portable electronic device also includes a position receiving device receiving position signals indicating a current position of the portable electronic device as the user follows the exercise route. The portable electronic device further includes a processor calculating a distance that the user has completed on the exercise route and a corresponding elapsed time for a completed portion of the exercise route, dynamically calculating a target pace for a remaining portion of the exercise route not yet completed, the target pace indicating a pace at which the user needs to move along the exercise route in order to achieve an exercise goal associated with the exercise route data received from the user, outputting the target pace to the user for informing the user about the target pace, and repeatedly dynamically calculating the target pace and outputting the target pace until completion of the exercise route.

It is an advantage that the present invention method calculates a target pace for informing the user about the target pace that the user needs to move at for a remaining portion of the exercise route not yet completed in order to achieve an exercise goal that the user set for the exercise route. In this way, the user can quickly understand exactly what pace the user must move at during a remaining portion of the exercise route in order for the user to achieve the exercise goal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a screen showing a first set of fitness data metrics.

FIG. 4 is a screen showing a second set of fitness data metrics.

FIG. 5 and FIG. 6 are screens showing additional sets of fitness data metrics.

DETAILED DESCRIPTION

Figure 1:
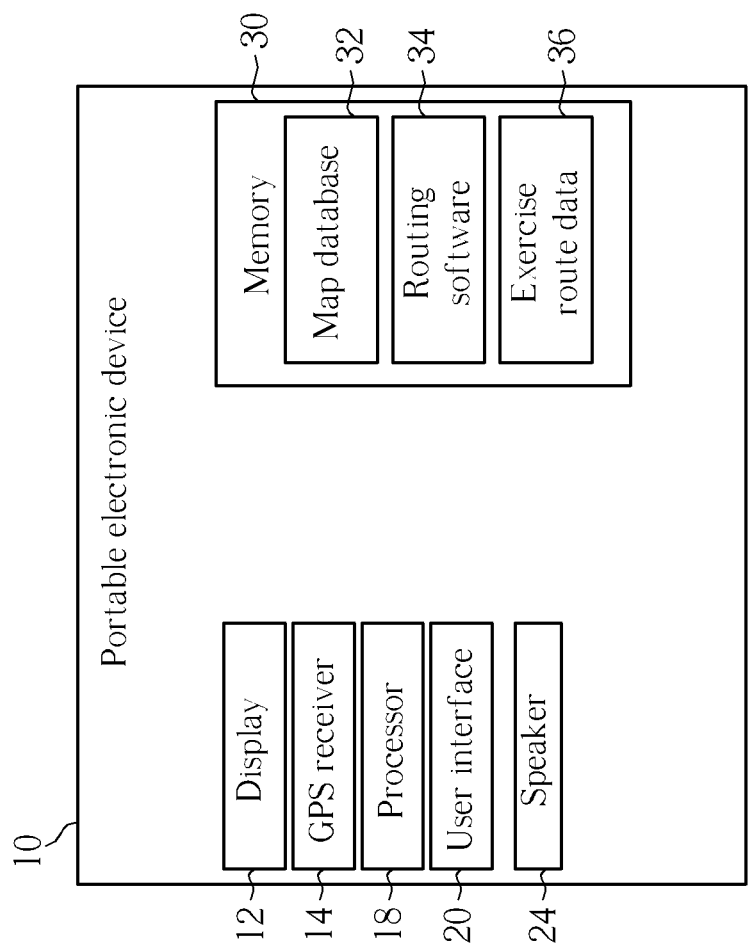
FIG. 1 is a block diagram of a portable electronic device according to the present invention.

Please refer to FIG. 1. FIG. 1 is a block diagram of a portable electronic device 10 according to the present invention. The portable electronic device 10 contains a display 12 which can be a touch sensitive display, a GPS receiver 14 for receiving position signals indicating the current position coordinates of the portable electronic device 10, a processor 18 for controlling operation of the portable electronic device 10, a user interface 20, a speaker 24 for outputting audio instructions to the user, and a memory 30. Instead of the speaker 24, a buzzer can also be used to provide audio feedback to the user. The memory 30 is used to store a map database 32 containing map data and points of interest. The memory 30 also stores routing software 34 used to create routes for the user to follow as well as to monitor routes that the user is following. User data such as exercise route data 36 is also stored in the memory 30 in order to have a record of what exercise route data parameters the user has entered for an exercise route being followed. The exercise route data parameters include a predetermined distance of an exercise route, a predetermined exercise time for the exercise route, and a desired pace to be used on the exercise route. The portable electronic device 10 can be created as a fitness watch wearable by a user, a personal navigation device, or a mobile phone.

The portable electronic device 10 of the present invention receives the input exercise route data parameters from the user through the user interface 20, monitors the current progress of the user on the exercise route, and provides the user with a target pace that the user needs to move at for a remaining portion of the exercise route in order to achieve an exercise goal that the user set for the exercise route. The processor 18 dynamically calculates the target pace according to the user's changing progress on the exercise route. The target pace can be updated constantly, such as once every second. The target pace is calculated according to the distance that the user has already completed on the exercise route and the corresponding elapsed time for the completed portion of the exercise route.

Figure 2:
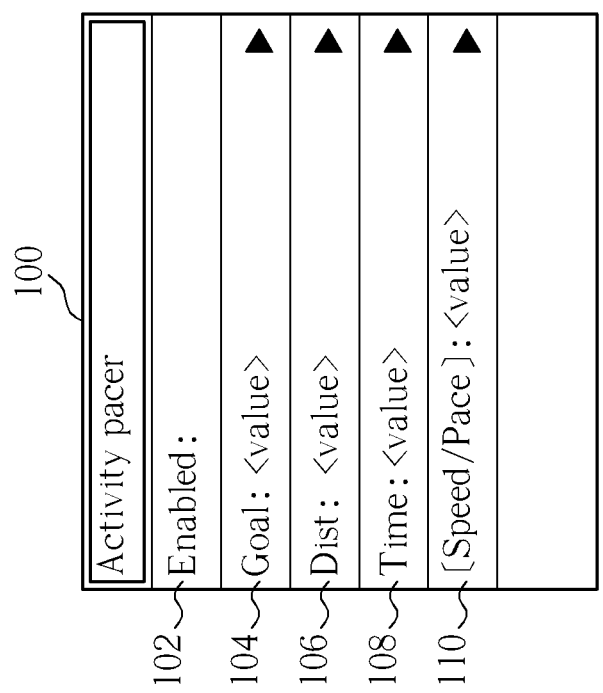
FIG. 2 is a screen shown on the display of the portable electronic device showing exercise route data parameters selectable by a user of the portable electronic device.

The fitness data metrics that are output by the portable electronic device 10 will vary according to the exercise route data parameters entered by the user. Please refer to FIG. 2. FIG. 2 is a screen 100 shown on the display 12 of the portable electronic device 10 showing exercise route data parameters selectable by a user of the portable electronic device 10. An "Enabled" option 102 allows a user to toggle on an off an Activity Pacer function which monitors the user's progress on an exercise route and calculates corresponding fitness data. A "Goal" option 104 allows the user to select a type of exercise data to be predetermined by the user. The goals that can be predetermined by the user include a combination of distance and time for the exercise route to last, a combination of distance for the exercise route to last along with a desired pace to be used on the exercise route, a combination of time for the exercise route to last along with a desired pace to be used on the exercise route, a distance for the exercise route to last, a time for the exercise route to last, or a desired pace to be used on the exercise route.

A "Distance" option 106 allows the user to specify a predetermined distance that the exercise route is to cover, whereas a "Time" option 108 allows the user to specify a predetermined time duration that the exercise route is to take. A "Speed/Pace" option 110 allows the user to specify a desired pace that the user wishes to move at while exercising on the exercise route. Depending on the "Goal" option 104 specified, the user will be given the opportunity to enter numerical values for one or two of the choices including the "Distance" option 106, the "Time" option 108, and the "Speed/Pace" option 110.

Please refer to FIG. 3 and FIG. 4. FIG. 3 is a screen 120 showing a first set of fitness data metrics, and FIG. 4 is a screen 130 showing a second set of fitness data metrics. The screen 120 displays a user's current pace 122, which is shown as taking 9 minutes and 39 seconds per mile. A target pace 124 is also displayed, which is shown as taking 9 minutes and 40 seconds per mile. This means that the user's current pace 122 is slightly faster than the target pace 124, and the user could slow down slightly and still complete the exercise route while meeting the user's original goals. Thus, the screen 120 provides the user with the target pace 124 for letting the user know exactly what pace will be needed from this point onwards to reach the overall goals for the exercise route. Screen 120 also displays a time ahead 126 of 3 minutes and 3 seconds, as well as a distance ahead 128 of 0.33 miles. The time ahead 126 and the distance ahead 128 let the user know exactly how much distance and time the user is ahead of the average pace needed to make the overall goal for the exercise route.

The screen 130 displays additional fitness data metrics beyond those shown in screen 120. An estimated time of arrival (ETA) 132 shows what time the user is expected to arrive at the end of the exercise route if the current pace is kept. In this example, the ETA is 10:54:00 am. An estimated total time 134 indicates that the user will exercise on the exercise route for 3 hours and 54 minutes if the current pace is kept. An estimated remaining time 136 estimates that there are 54 minutes remaining on the exercise route if the current pace is kept. A remaining distance 138 calculates that there are 6.20 miles remaining in the exercise route.

The screens 120 and 130 are applicable when the user has specified exercise route data parameters of a predetermined distance of the exercise route and a predetermined exercise time for the exercise route. When the predetermined distance and the predetermined exercise time are provided by the user, the average pace of the exercise route will be automatically calculated by the portable electronic device 10. In this situation the screen 120 will show the current pace 122, the target pace 124, the time ahead/behind 126, and the distance ahead/behind 128. The screen 130 will show the ETA 132, the estimated total time 134, the estimated remaining time 136, and the remaining distance 138.

The screens 120 and 130 are also applicable when the user has specified exercise route data parameters of the predetermined distance of the exercise route and a desired average pace for the exercise route. When the predetermined distance and the desired pace are provided by the user, the exercise time of the exercise route will be automatically calculated by the portable electronic device 10. In this situation the screen 120 will show the current pace 122, the target pace 124, the time ahead/behind 126, and the distance ahead/behind 128.

The screen 130 will show the ETA 132, the estimated total time 134, the estimated remaining time 136, and the remaining distance 138.

While the target pace 124 is dynamically calculated, all other parameters are dynamically changed based on the user's current pace 122, such as ETA 132, estimated total time 134, the estimated remaining time 136, and the remaining distance 138. Therefore, when outputting the dynamically calculated target pace 124 to the user, other parameters outputted on the display 12 are also dynamically changed. For example, considering the user's current pace 122, the ETA 132 will also be updated so the user will never be wondering what time he will be getting home.

Please refer to FIG. 3 and FIG. 5. FIG. 5 is a screen 140 showing another set of fitness data metrics. The screen 120 of FIG. 3 and the screen 130 of FIG. 5 are applicable when the user has specified exercise route data parameters of the predetermined exercise time for the exercise route and a desired average pace for the exercise route. When the predetermined exercise time and the desired pace are provided by the user, the estimated distance of the exercise route will be automatically calculated by the portable electronic device 10.

The screen 140 displays additional fitness data metrics beyond those shown in screen 120. An estimated time of arrival (ETA) 142 shows what time the user is expected to arrive at the end of the exercise route if the current pace is kept. In this example, the ETA is 11:00:00 am. An estimated total distance 144 indicates that the user will be able to move 26.66 miles if the current pace is kept. A remaining time 146 indicates that there is one hour remaining in the predetermined exercise time. An estimated remaining distance 148 shows that there is an estimated 6.66 miles remaining in the exercise route if the current pace is kept.

When the predetermined exercise time and the desired pace are provided by the user, the estimated distance of the exercise route will be automatically calculated by the portable electronic device 10. In this situation the screen 120 will show the current pace 122, the target pace 124, the time ahead/behind 126, and the distance ahead/behind 128. The screen 140 will show the ETA 142, the estimated total distance 144, the remaining time 146, and the estimated remaining distance 148.

Please refer to FIG. 4. When only the predetermined distance is provided by the user, it is not possible to automatically calculate in advance an exact time for the exercise route or an average pace that the user will move at while on the exercise route. Instead, the portable electronic device 10 can only measure the user's current pace and estimate how long the exercise route will last based on the predetermined distance and the current pace. In this situation only the screen 130 is needed to convey the known fitness data metrics. The screen 130 will show the ETA 132, the estimated total time 134, the estimated remaining time 136, and the remaining distance 138.

Please refer to FIG. 5. When only the predetermined exercise time is provided by the user, it is not possible to automatically calculate in advance an exact distance for the exercise route or an average pace that the user will move at while on the exercise route. Instead, the portable electronic device 10 can only measure the user's current pace and estimate a distance of the exercise route based on the predetermined exercise time and the current pace. In this situation only the screen 140 shown in FIG. 5 is needed to convey the known fitness data metrics. The screen 140 will show the ETA 142, the estimated total distance 144, the remaining time 146, and the estimated remaining distance 148.

Please refer to FIG. 6. FIG. 6 is a screen 150 showing another set of fitness data metrics. When only the desired exercise pace is provided by the user, it is not possible to automatically calculate in advance an exact distance or exercise time for the exercise route. Instead, the portable electronic device 10 can only measure the user's current pace and tell the user how far ahead or behind the desired pace the user is according to the user's current pace. In this situation only the screen 150 is needed to convey the known fitness data metrics. The screen 150 will show a user's current pace 152, which is shown as taking 9 minutes and 39 seconds per mile. An average pace 154 over the portion of the exercise route completed so far is shown as being 9 minutes per mile. Thus, the user is currently moving slower than the user was moving earlier in the exercise route. The screen 150 also shows a time ahead 156 of 3 minutes and 3 seconds, as well as a distance ahead 158 of 0.33 miles. The time ahead 156 and the distance ahead 158 let the user know exactly how much distance and time the user is ahead of the desired pace set by the user as the goal for the exercise route.

Figure 7:
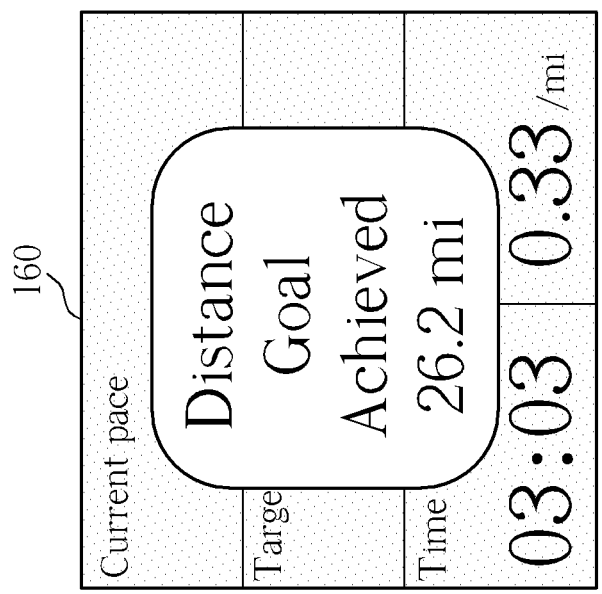
FIG. 7 is a screen shown when a user completes a goal of a predetermined distance.
Figure 8:
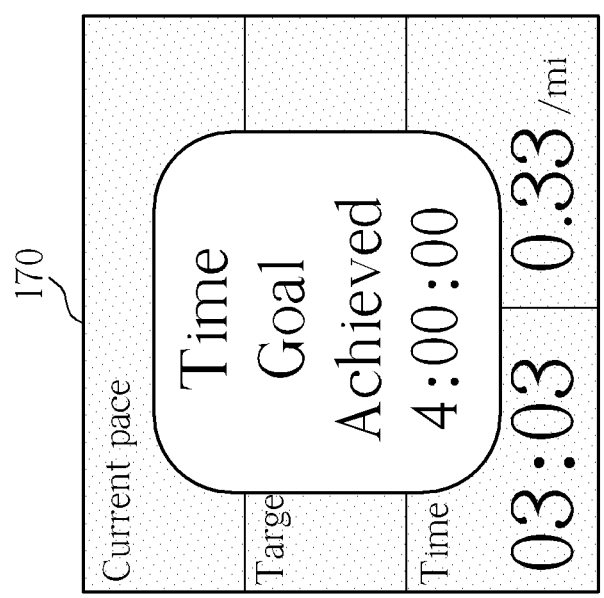
FIG. 8 is a screen shown when a user completes a goal of a predetermined exercise time.

Please refer to FIG. 7 and FIG. 8. FIG. 7 is a screen 160 shown when a user completes a goal of a predetermined distance. In this example, the user set a goal of 26.2 miles. Once the distance goal is met, the screen 160 will indicate this fact to the user. FIG. 8 is a screen 170 shown when a user completes a goal of a predetermined exercise time. In this example, the user set a goal of 4 hours. Once the exercise time goal is met, the screen 170 will indicate this fact to the user.

It will be appreciated that exercise goals can be pre-stored in the exercise route data 36 portion of the memory 30 of the portable electronic device 10 so that the user does not need to manually enter new goals each time the user wishes to start on an exercise route. Instead of outputting the fitness data metrics on the display 12 of the portable electronic device 10, updated fitness data metrics can be output through the speaker 24 instead so that the user does not need to take time to glance at the display 12.

In summary, the present invention calculates fitness data metrics for informing the user about the user's current progress on an exercise route. Notably, the present invention calculates a target pace for informing the user about the target pace that the user needs to move at for a remaining portion of the exercise route not yet completed in order to achieve an exercise goal that the user set for the exercise route. In this way, the user can quickly understand exactly what pace the user must move at during a remaining portion of the exercise route in order for the user to achieve the exercise goal. The user can then adjust the user's current pace to try and match the target pace calculated by the portable electronic device 10.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of informing a user of a portable electronic device about a pace that the user needs to maintain in order to achieve an exercise goal, the method comprising:

receiving a selection of exercise route data from the user, the exercise route data including at least two parameters selected from a group consisting of a predetermined distance of an exercise route, a predetermined exercise time for the exercise route, and a desired pace to be used on the exercise route;

receiving position signals indicating a current position of the portable electronic device as the user follows the exercise route;

calculating a distance that the user has completed on the exercise route and a corresponding elapsed time for a completed portion of the exercise route;

dynamically calculating a target pace for a remaining portion of the exercise route not yet completed, the target pace indicating a pace at which the user needs to move along the exercise route in order to achieve an exercise goal associated with the exercise route data received from the user;

outputting the target pace to the user for informing the user about the target pace; and repeatedly dynamically calculating the target pace and outputting the target pace until completion of the exercise route.

2. The method of claim 1, wherein receiving the selection of exercise route data from the user comprises receiving the predetermined distance of the exercise route and the predetermined exercise time for the exercise route, and the desired exercise pace to be used on the exercise route is calculated according to the predetermined distance and the predetermined exercise time.

3. The method of claim 1, wherein receiving the selection of exercise route data from the user comprises receiving the predetermined distance of the exercise route and the desired exercise pace to be used on the exercise route, and the predetermined exercise time for the exercise route is calculated according to the predetermined distance and the desired exercise pace.

4. The method of claim 1, wherein receiving the selection of exercise route data from the user comprises receiving the predetermined exercise time for the exercise route and the desired exercise pace to be used on the exercise route, and the predetermined distance of the exercise route is calculated according to the predetermined exercise time and the desired exercise pace.

5. The method of claim 1, wherein outputting the target pace to the user comprises displaying the target pace on a display of the portable electronic device.

6. The method of claim 1, wherein outputting the target pace to the user comprises outputting audio signals indicating the target pace through a speaker of the portable electronic device.

7. The method of claim 1, wherein when dynamically calculating the target pace for the remaining portion of the exercise route not yet completed, other parameters are dynamically calculated and updated based on a current pace that the user is moving along the exercise route, and the other parameters are output to the user.

8. The method of claim 7, wherein the other parameters dynamically calculated, updated, and output to the user include an estimated time of arrival at which the exercise route will be completed, an estimated total time spent on the exercise route, an estimated time remaining on the exercise route, and a remaining distance of the exercise route.

9. A portable electronic device informing a user of the portable electronic device about a pace that the user needs to maintain in order to achieve an exercise goal, the portable electronic device comprising:

a user interface for receiving a selection of exercise route data from the user, the exercise route data including at least two parameters selected from a group consisting of a predetermined distance of an exercise route, a predetermined exercise time for the exercise route, and a desired pace to be used on the exercise route;

a position receiving device receiving position signals indicating a current position of the portable electronic device as the user follows the exercise route; and a processor calculating a distance that the user has completed on the exercise route and a corresponding elapsed time for a completed portion of the exercise route, dynamically calculating a target pace for a remaining portion of the exercise route not yet completed, the target pace indicating a pace at which the user needs to move along the exercise route in order to achieve an exercise goal associated with the exercise route data received from the user, outputting the target pace to the user for informing the user about the target pace, and repeatedly dynamically calculating the target pace and outputting the target pace until completion of the exercise route.

10. The portable electronic device of claim 9, wherein receiving the selection of exercise route data from the user comprises receiving the predetermined distance of the exercise route and the predetermined exercise time for the exercise route, and the desired exercise pace to be used on the exercise route is calculated according to the predetermined distance and the predetermined exercise time.

11. The portable electronic device of claim 9, wherein receiving the selection of exercise route data from the user comprises receiving the predetermined distance of the exercise route and the desired exercise pace to be used on the exercise route, and the predetermined exercise time for the exercise route is calculated according to the predetermined distance and the desired exercise pace.

12. The portable electronic device of claim 9, wherein receiving the selection of exercise route data from the user comprises receiving the predetermined exercise time for the exercise route and the desired exercise pace to be used on the exercise route, and the predetermined distance of the exercise route is calculated according to the predetermined exercise time and the desired exercise pace.

13. The portable electronic device of claim 9, wherein outputting the target pace to the user comprises displaying the target pace on a display of the portable electronic device.

14. The portable electronic device of claim 9, wherein outputting the target pace to the user comprises outputting audio signals indicating the target pace through a speaker of the portable electronic device.

15. The portable electronic device of claim 9, wherein when dynamically calculating the target pace for the remaining portion of the exercise route not yet completed, the processor dynamically calculates and updates other parameters based on a current pace that the user is moving along the exercise route, and outputs the other parameters to the user.

16. The portable electronic device of claim 15, wherein the other parameters dynamically calculated, updated, and output to the user include an estimated time of arrival at which the exercise route will be completed, an estimated total time spent on the exercise route, an estimated time remaining on the exercise route, and a remaining distance of the exercise route.

* * * * *